United States Patent [19]

Strolle

[11] Patent Number: 4,462,024
[45] Date of Patent: Jul. 24, 1984

[54] MEMORY SCANNING ADDRESS GENERATOR

[75] Inventor: Christopher H. Strolle, Philadelphia, Pa.

[73] Assignee: RCA Corporation, New York, N.Y.

[21] Appl. No.: 305,173

[22] Filed: Sep. 24, 1981

[30] Foreign Application Priority Data

Mar. 24, 1981 [GB] United Kingdom ................. 8109253

[51] Int. Cl.³ .............................................. G09G 1/16
[52] U.S. Cl. ..................................... 340/727; 340/728
[58] Field of Search ............... 340/727, 728, 721, 745, 340/747

[56] References Cited

U.S. PATENT DOCUMENTS

| | | | |
|---|---|---|---|
| 3,772,677 | 11/1973 | Sommer | 340/727 |
| 4,127,850 | 11/1978 | Vallins | 340/728 |
| 4,205,389 | 5/1980 | Heartz | 340/747 |
| 4,245,321 | 1/1981 | Gennetten | 340/727 |
| 4,262,290 | 4/1981 | Vallins | 340/747 |
| 4,352,105 | 9/1982 | Harney | 340/747 |
| 4,384,286 | 5/1983 | Toro | 340/727 |

Primary Examiner—Marshall M. Curtis
Attorney, Agent, or Firm—Joseph S. Tripoli; George E. Haas; Allen LeRoy Limberg

[57] ABSTRACT

Improved accumulation apparatus for generating phantom raster in skewed Cartesian coordinates uses two, rather than four, accumulators. Arrangements for accommodating non-square pixels are described; as well as arrangements for accommodating the display image being compressed, expanded, or changed in aspect ratio.

12 Claims, 12 Drawing Figures

MEMORY SCANNING ADDRESS GENERATOR

The invention relates to the generation of addresses for raster-scanning, at a programmable skew angle, the storage locations of a memory addressed by column and by row.

Such an address generator is useful in television for generating phantom raster presentations of rotated display images retrieved from a field storage memory (FSM, for short). The FSM has information stored in it which is addressed in the x and y Cartesian coordinates describing the raster scanning of an unrotated image, but this image is retrieved while addressing the memory with a phantom raster defined in u and v Cartesian coordinates that are skewed respective to the raster scanning of the image without rotation.

Phantom raster generation using scan conversion of raster scan in x and y Cartesian coordinates to phantom raster scan in u and v Cartesian coordinates for skew-addressing a memory in which information was originally stored using x and y address coordinates is known, for instance, from U.S. Pat. No. 3,925,765 issued Dec. 9, 1975 to Berwin and Wilber and entitled "DIGITAL RASTER ROTATOR". They disclose using binary rate multipliers for scan conversion purposes, the counters in the binary rate multipliers supplying the row and column addresses used during the retrieval of a stored frame from memory. The rates of their counting are programmable as a function of the rotation of the phantom raster respective to the actual display raster. These counting rates tend to be impractically high if the field storage memory is to be updated 1/30 or 1/60 second intervals, presuming display vertical resolution to be somewhere around $2^8$ or $2^9$ lines and display horizontal resolution to substantially correspond. This is especially so when the u and v Cartesian coordinates are to be generated with excess resolution to facilitate two-dimensional brightness weighting or linear interpolation among data retrieved from four adjacent storage locations in the FSM.

U.S. Pat. No. 4,127,850 issued Nov. 28, 1978 to Vallins and entitled "SCANNING DISPLAY APPARATUS" describes accumulation techniques for generating u and v Cartesian coordinates with excess resolution. Four accumulators are used in the Vallins apparatus. Two of them accumulate cos $\phi$ and sin $\phi$ at pixel-scan and line-scan rates, respectively, for providing distinct signals to be added together; and the resulting sum is added to a u offset term to develop u coordinates of phantom raster scan. The other two accumulators accumulate-sin $\phi$ and cos $\phi$ at pixel-scan and line-scan rates, respectively for providing distinct signals to be added together; and the resulting sum is added to a v offset term to develop v coordinates of phantom raster scan. Calculations in the Vallins system are carried forward with the origin of the x, y and u, v coordinate systems being at a corner of display raster rather than at the center of rotation between the two systems. One arranges for the start of the scan conversion to be at the first point raster-scanned on the display screen in the area where the rotated graphic image is to be displayed, so that the rotation angle can be reprogrammed between field scans without introducing errors in the graphic image being displayed. Putting the origin of the u, v coordinate system at this point makes possible the initialization of all four of the accumulators to zero at this point and the initialization of the two accumulators operating at pixel scan rate to zero at beginning of line scan.

The invention in a principal one of its aspects is directed to accumulating u and v coordinates in only two separate accumulators. One accumulator develops u coordinate by accumulating both cos $\phi$ at pixel scan rate and sin $\phi$ at line scan rate with no distinct accumulated cos $\phi$ and accumulated sin $\phi$ signals. The other accumulator develops v coordinate by accumulating both $-\sin \phi$ at pixel scan rate and cos $\phi$ at line scan rate with no distinct accumulated-sin $\phi$ and accumulated cos $\phi$ signals. This is made possible by altering the contents of the u and v accumulators by multiples of $-\cos \phi$ and of sin $\phi$ respectively at the end of each line scan to account for retrace. The multiple is the number of pixels in that portion of the scan line traversing the area on display screen for which corresponding phantom raster is to be generated.

Figure 3:
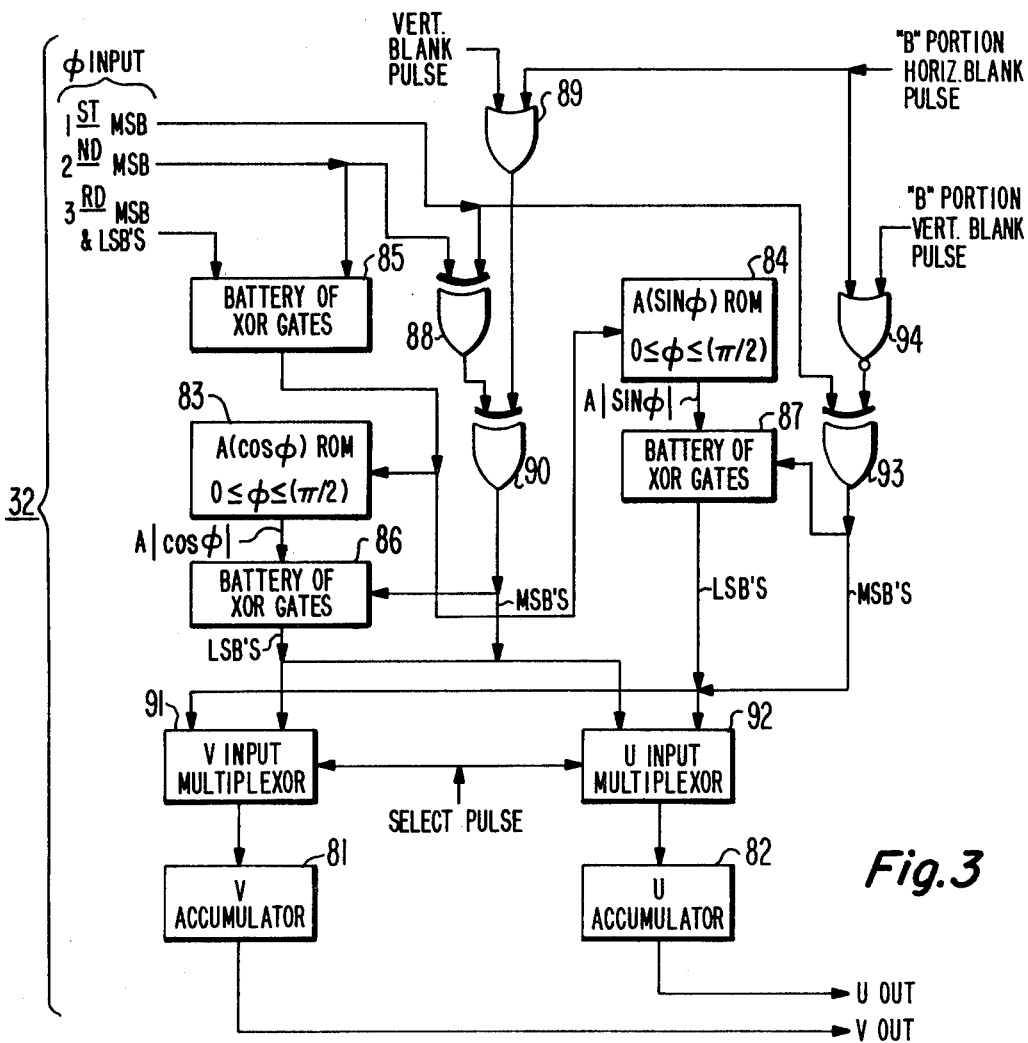
Figure 4:
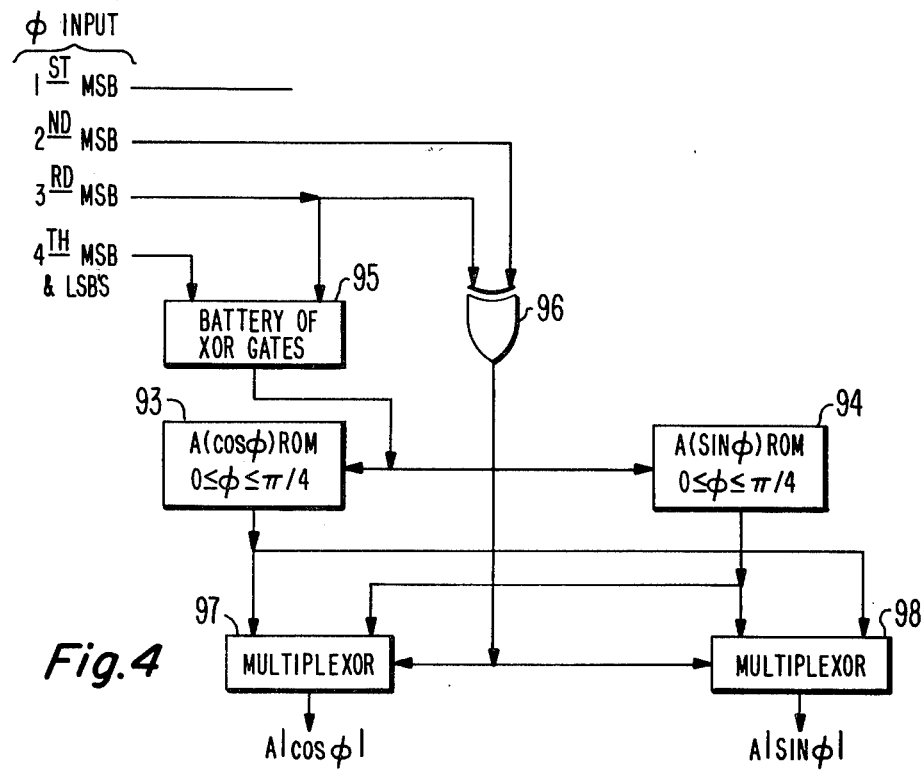
Figure 6:
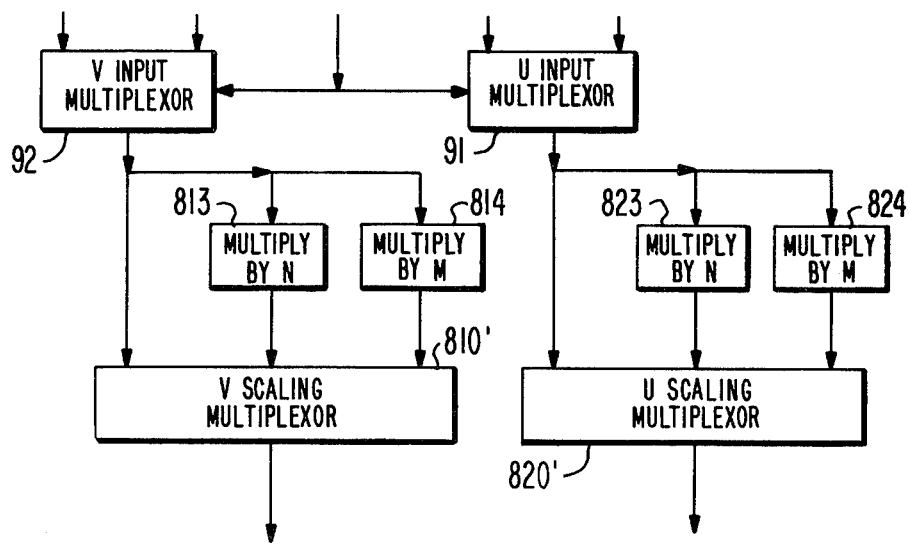
Figure 5:
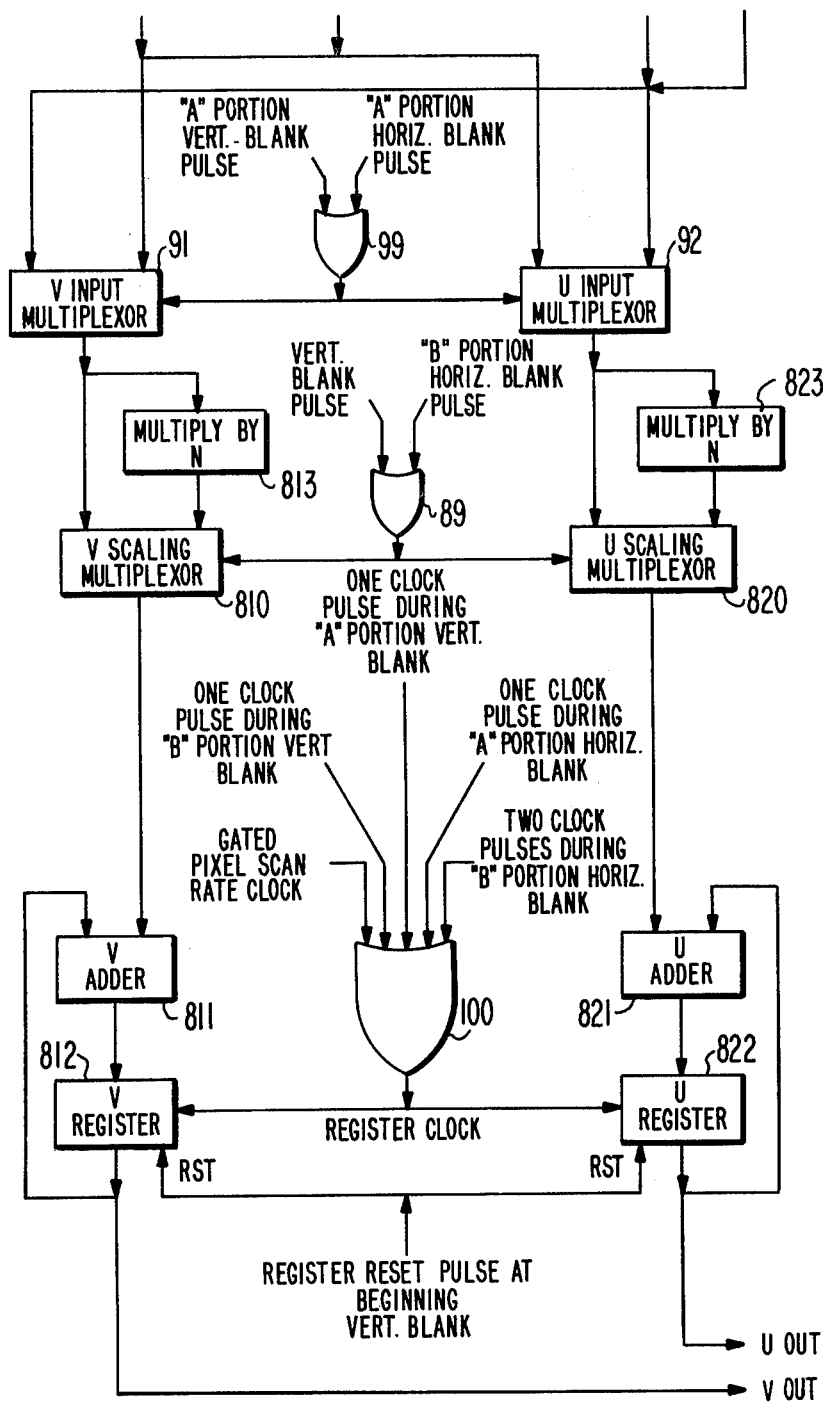
Figure 7:
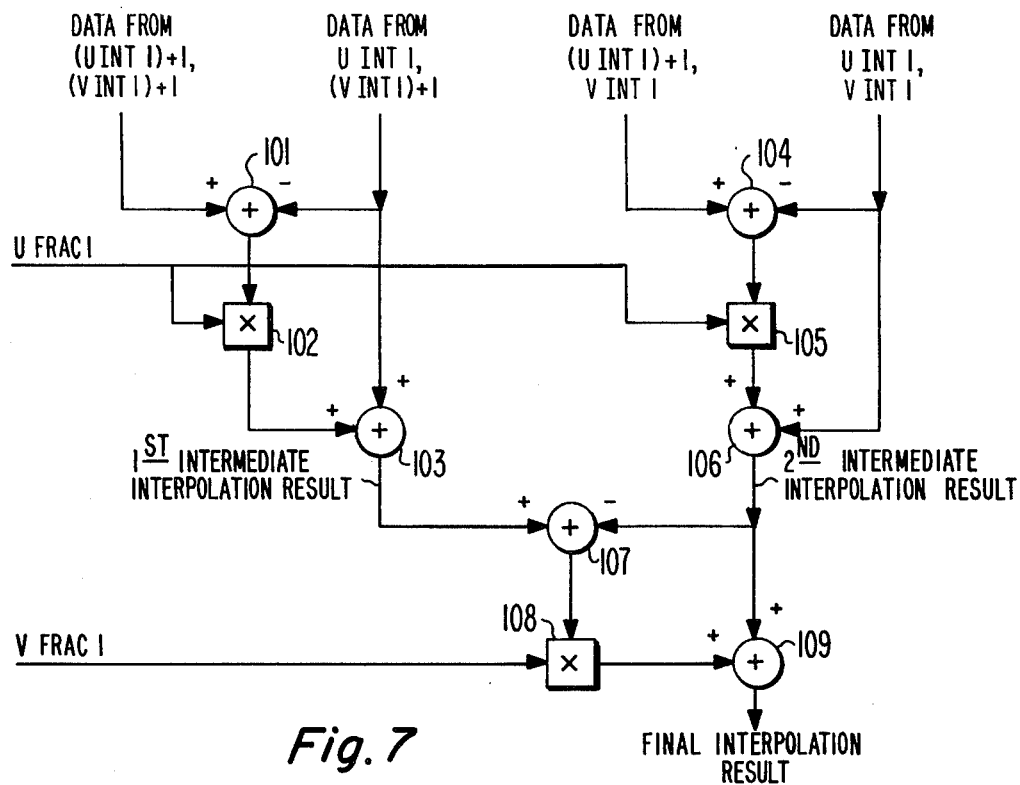
Figure 8:
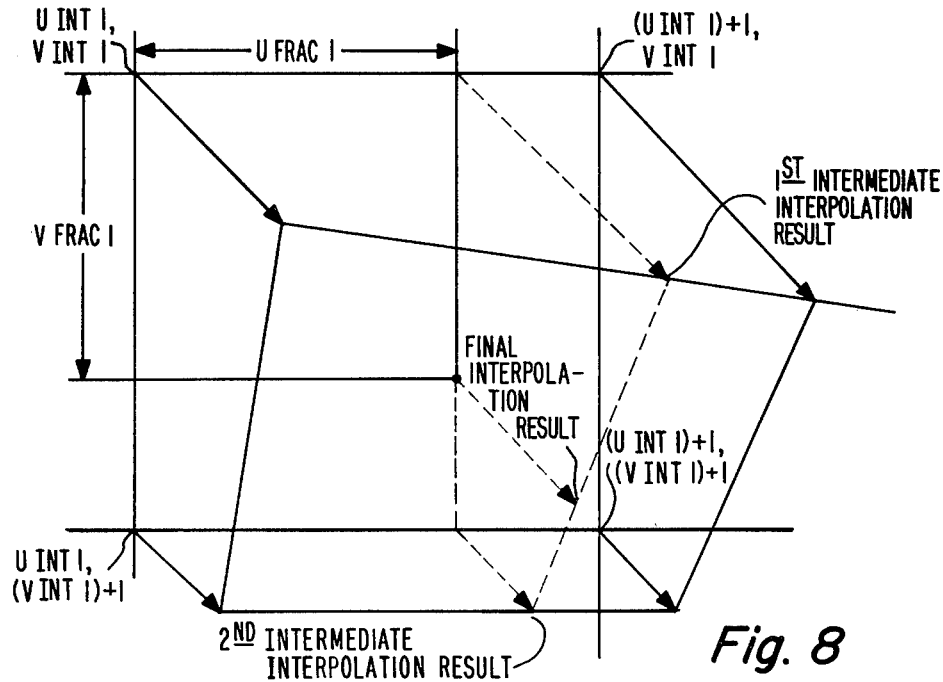
Figure 9:
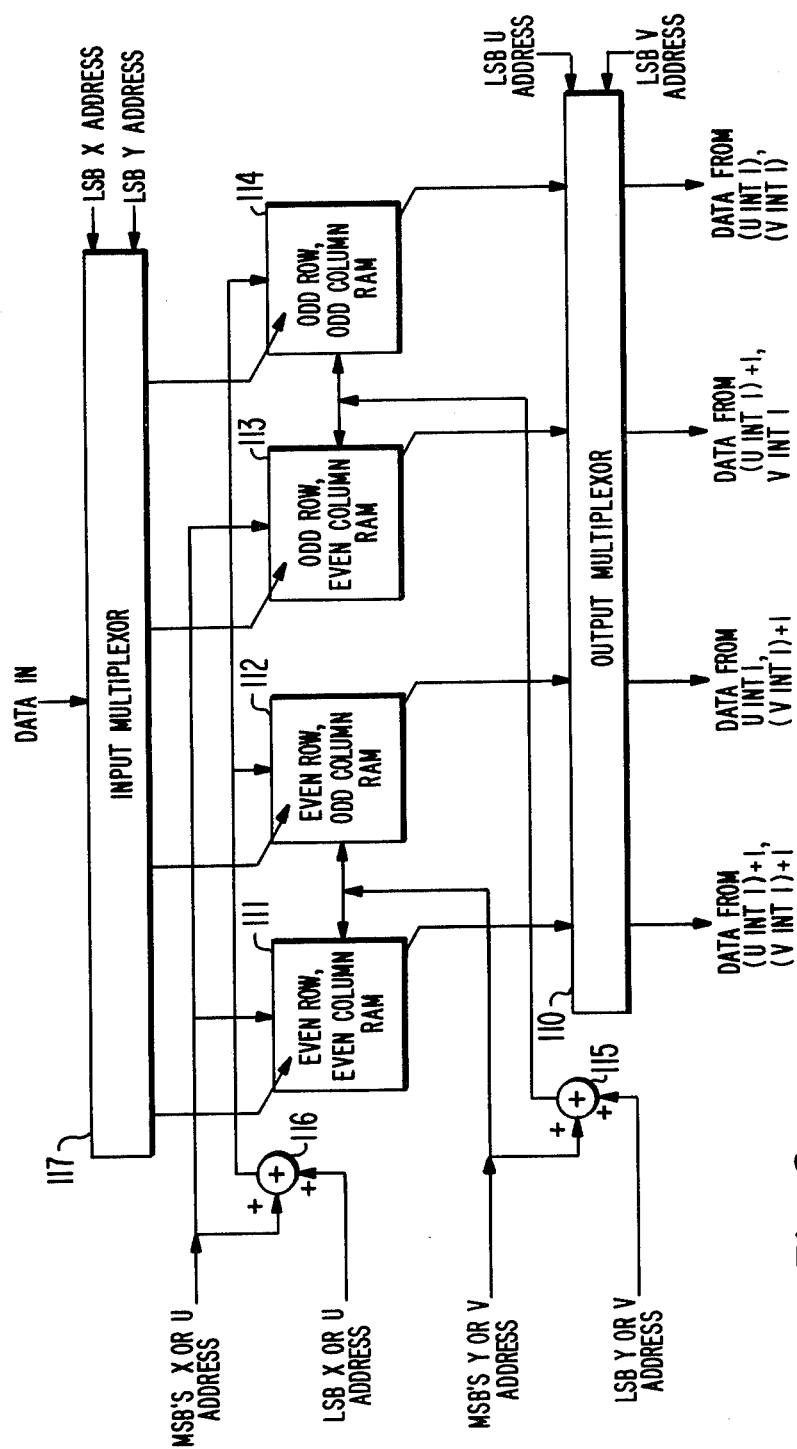
Figure 10:
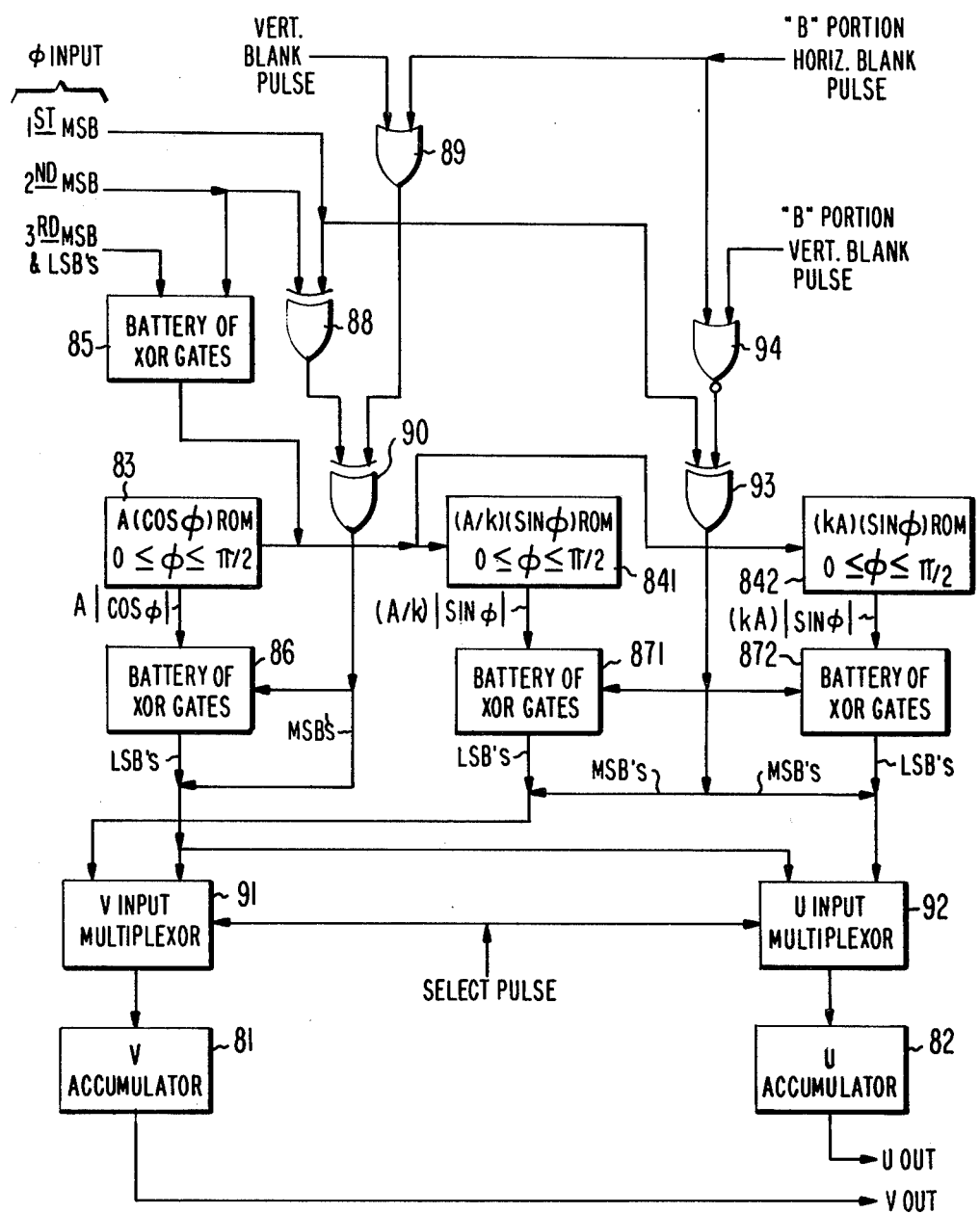
Figure 11:
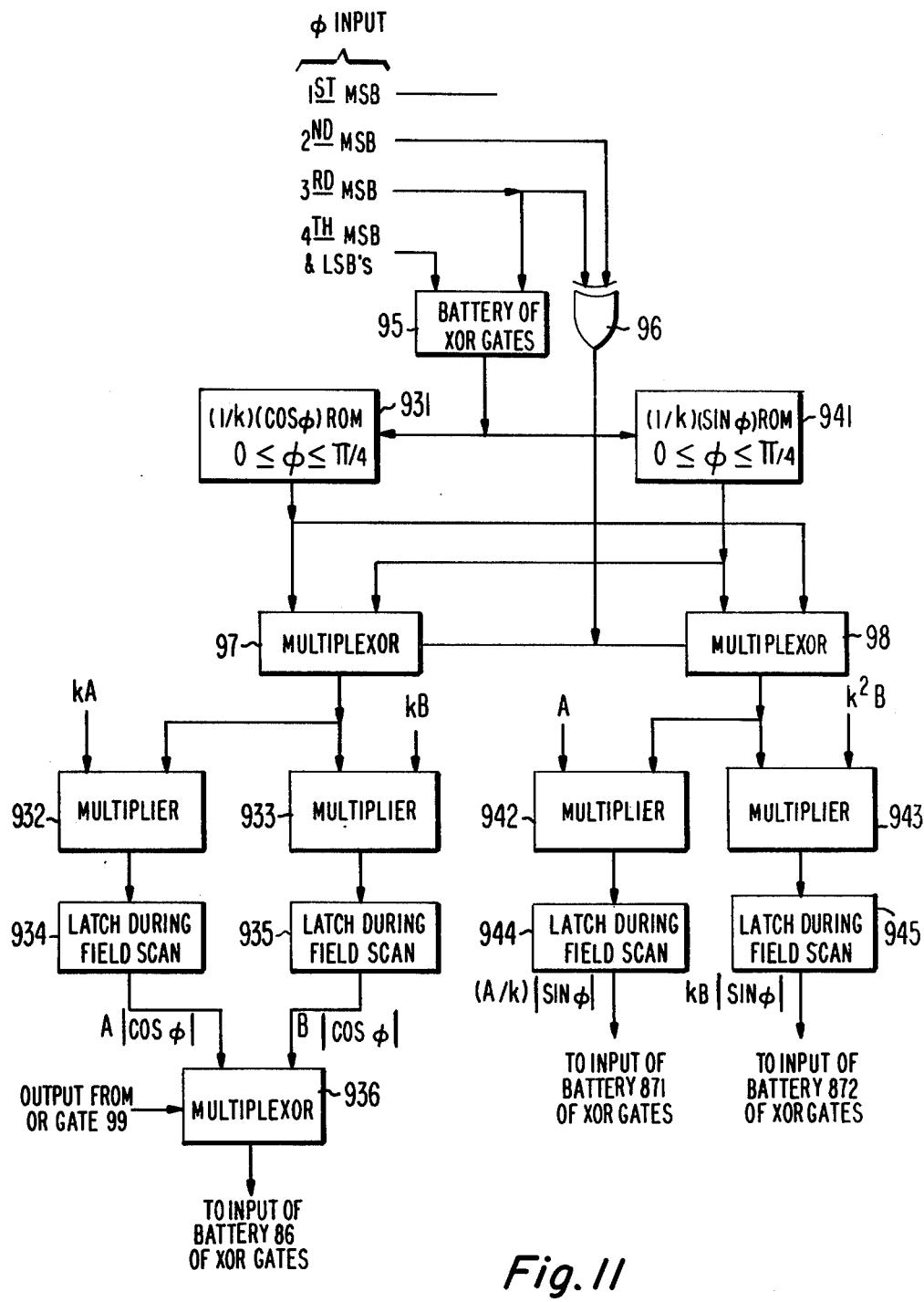
Figure 12:
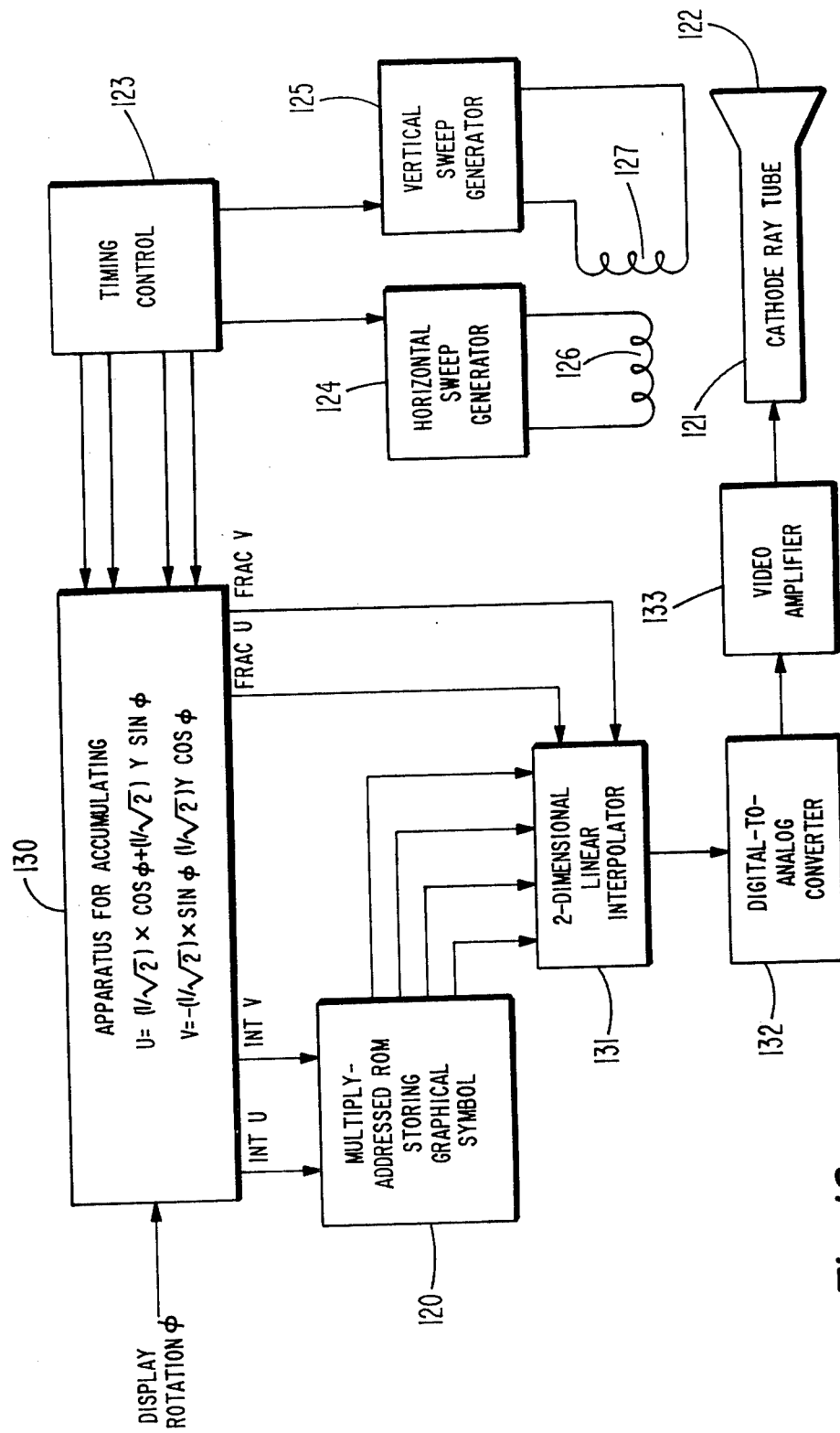

FIG. 3 is a block diagram of a read address generator for generating at video rates programmably-skewed phantom-raster-scanned read addresses for the field storage memory from which display information is taken, the skewed read addresses being generated by accumulation techniques that permit high resolution read addresses to be generated without need for data rates many times higher than video rate;

FIG. 4 is a block diagram of a modification of the read address generator of FIG. 3;

FIG. 5 is a block diagram showing still further details of the circuitry of the read address generator of FIG. 3 or of FIG. 3 as modified per FIG. 4;

FIG. 6 is a block diagram showing a modification of the FIG. 5 circuitry;

FIG. 7 is a block diagram showing the two-dimensional linear interpolator in great detail;

FIG. 8 is a graph useful in understanding the nature of two-dimensional linear interpolation;

FIG. 9 is a block diagram showing an organization of the field storage memory which permits four storage locations to be read out in parallel to the two-dimensional linear interpolator;

FIG. 10 is a block diagram of a modification of the FIG. 4 read address generator to accomodate non-square pixels;

FIG. 11 is a block diagram of still further modification to accomodate programmable changing of displayed image aspect ratio as well; and FIG. 12 is a block diagram showing a system for generating rotated images responsive to skew-addressing of a memory storing a graphic symbol, carried out in accordance with the present invention.

Figure 1:
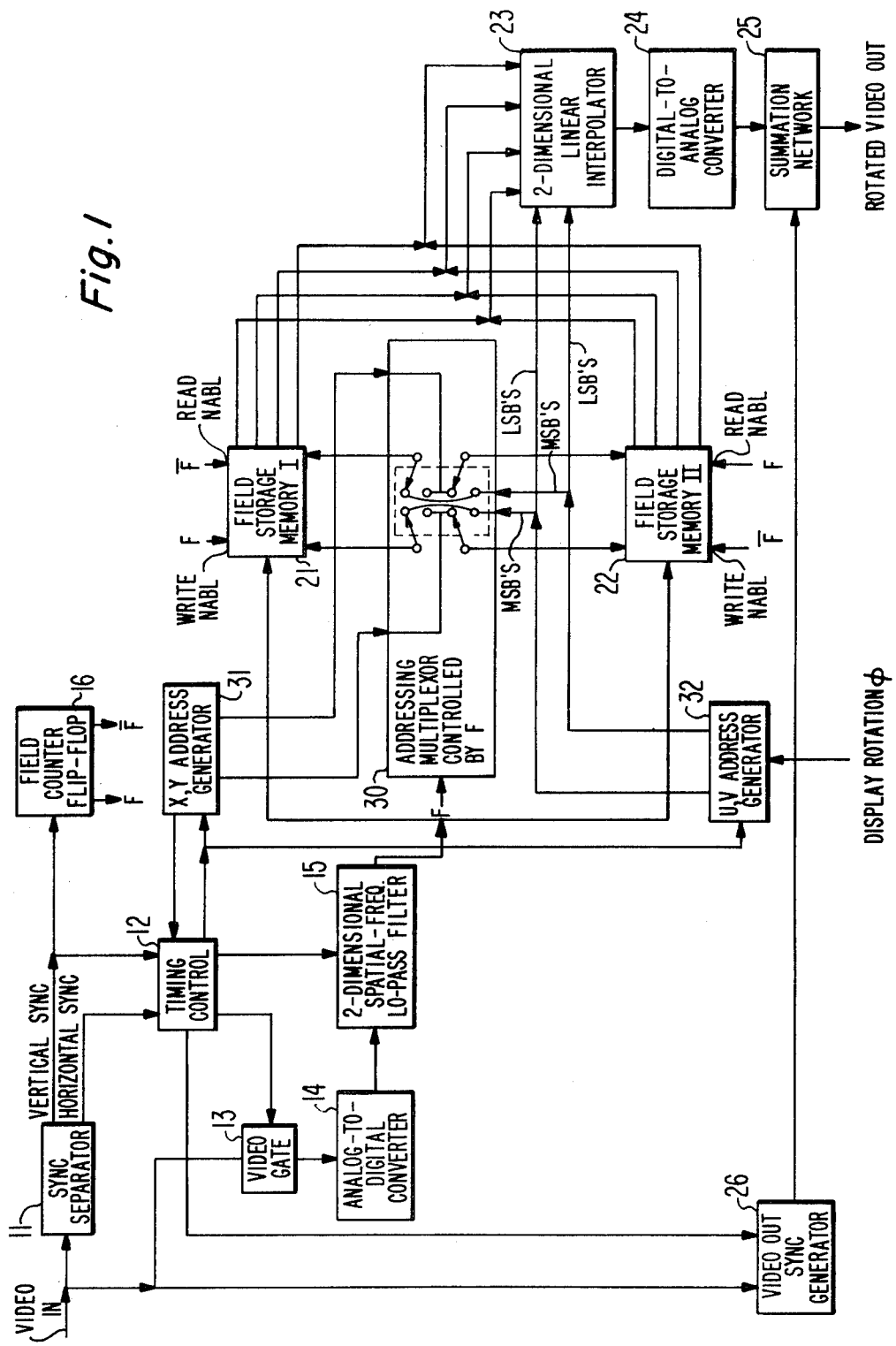
FIG. 1 is a block diagram of apparatus for generating monochromatic phantom raster display presentations, which embodies the present invention.

The FIG. 1 phantom-raster-generating apparatus video input signal is applied to a sync separator 11 which separates the horizontal and vertical sync pulses from the video input signal and supplies it to timing control circuitry 12. This circuitry includes a master clock generator synchronized to a multiple of the horizontal sync signal fundamental frequency, this being done with an automatic frequency and phase control (AFPC) system. Timing control circuitry 12 also includes frequency divider circuitry from which timing control output signals are taken.

A first of these timing control output signals indicates when the horizontal or vertical sync blocks occur and is applied as a control input to a video gate 13. Gate 13 responds to pass only the picture-interval portions of the video input signal to the input of an analog-to-digital converter 14, which digitizes the video information. The resulting stream of digital data is shown applied to the input of a two-dimensional spatial-frequency low-pass filter 15, which modifies the image so its resolution is substantially equal in all directions to its former horizontal and vertical resolution.

Vertical sync pulses from sync separator 11 are applied as triggering signal to a triggered flip-flop 16 which counts the video display fields modulo two. Output F from flip-flop 16 when high provides a WRITE ENABLE signal to a first field storage memory 21 and a READ ENABLE signal to a second field storage memory 22. Output F̄ from flip-flop 16, complementary to output F, when high provides a WRITE ENABLE signal to FMS 22 and a READ ENABLE signal to FMS 21. During every other field, FMS 21 is conditioned to receive data from filter 15 for storage during its write cycle, while FMS 22 is conditioned to deliver data during its read cycle to interpolator 23. During the intervening fields, FMS 22 is conditioned to receive data from filter 15 for storage, while FMS 21 is conditioned to deliver data to interpolator 23.

Interpolator 23 output is converted to analog form in digital-to-analog converter 24, and the analog video has sync information reinserted in summation network 25 to supply video output information. The re-inserted sync information is supplied from a sync generator 26 in a timing controlled by a second timing control signal from timing control circuitry 12. Sync generator 26 may actually generate new sync information, or (assuming the alternate field scans not to be interleaved as to line scan) it may simply strip old sync information from the video input signal and forward it to summation network 25.

An addressing multiplexor 30 responds to F or F̄ both to selectively apply the Cartesian coordinates x and y from an x, y address generator 31 as WRITE addressing to the one of FMS's 21 and 22 provided with WRITE ENABLE from flip-flop 16. At the same time multiplexor 30 selectively applies the modulus portions of Cartesian coordinates u and v from a u, v address generator 32 as READ addressing to the other of the FMS's 21 and 22, the one provided with READ ENABLE from flip-flop 16. The basic equivalent circuit of the switching by the addressing multiplexor is sketched within the block 30 to aid understanding of the nature of the switching the multiplexor does, although in actuality the multiplexor uses electronic switching, of course.

The x and y Cartesian coordinates generated by address generator 31 are along axes respectively parallel to and perpendicular to the direction of line scan in the unrotated display. In this specification the positive directions along the x and y coordinate axes will be assumed to extend to the right of the display scan as viewed from the front and to extend downwards, respectively; and clockwise rotation will be considered to be positive, departing from conventional right-hand coordinate system in favor of the left-hand coordinate system more customarily used for describing television systems that scan from left to right. That is, a vector positively directed along the x axis thereafter rotated clockwise $+90°$ will be positively directed along the y axis. As will be discussed in more detail further on in the specification, it is convenient to generate the x and y coordinates in two's complement form with their zero values defining the center of rotation of the stored display information.

The u and v Cartesian coordinates generated by address generator 32 are orthogonal to each other, a vector positively directed along the u axis thereafter rotated $+90°$ being redirected to be positively directed along the v axis. Display rotation angle, $\phi$, information is supplied to address generator 32 to program the rotation angle $\phi$ between the coordinate systems—that is, between the x and u axes and between the y and v axes. The well-known equations describing the transformation between coordinate systems are as follows:

$$u = A(x \cos \phi + y \sin \phi) \quad (1)$$

$$v = A(-x \sin \phi + y \cos \phi) \quad (2)$$

The factor A is a positive scaling constant, which can be altered to zoom the phantom raster presentations and will generally be somewhat more than unity where the phantom raster is to slightly overscan the original, unrotated image. The x and y coordinates are presumed to be always integral in value; so except for special values of $\phi$, the u and v coordinates will be non-integral in value. The more significant bits of each of the u and v coordinates that define its integral value will be referred to in this specification as the "modulus" of the coordinate, and the less significant bits that define its fractional value, as the "residue" of the coordinate. The moduli of the u and v coordinates are used as the READ addresses of FSM's 21 and 22. The residues of the u and v coordinates are supplied to the two-dimensional linear interpolator 23 to control the interpolation between the four digital data read out of the selected FM 21 or 22, as will be explained in detail later in this specification.

Figure 2:
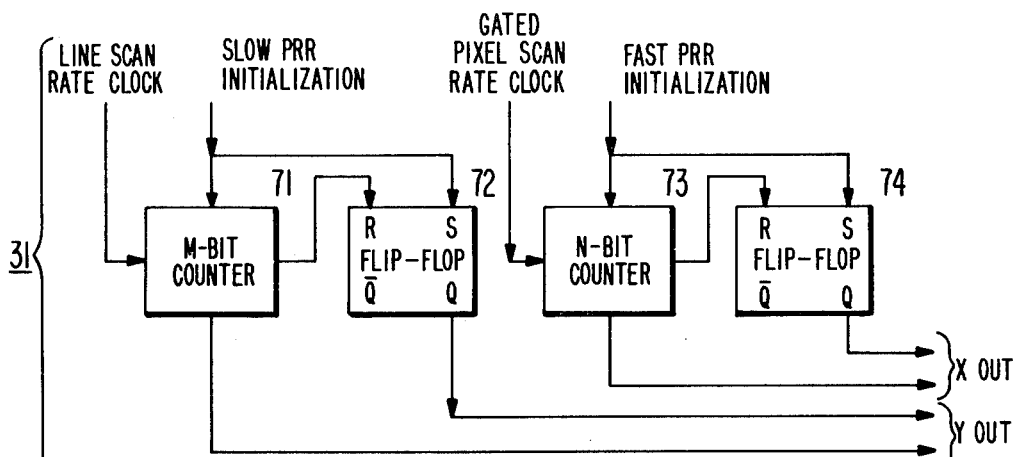
FIG. 2 is a block diagram of a write address generator for generating at video rates the raster-scanned write address for field storage memory.

A preferred form of the x, y address generator 31 shown in greater detail in FIG. 2 generates x and y spatial-domain Cartesian coordinates in two's complement form to facilitate signed arithmetic. In certain industrial and military television applications it is convenient to use a raster-scanned display with $2^{(m+1)}$ active lines each with $2^{(n+1)}$ pixels, m and n each being a respective integer, usually 7, 8 or 9. A square aspect ratio, where $m = n$, is convenient to use in applications where rotation of display is frequently called for; and this type of television system will be considered in this specification except where otherwise specifically noted.

The y coordinate of raster scan is generated in two's complement form using an m-bit counter 71 and a set-reset flip-flop 72, its most significant bit being provided by the Q output of flip-flop 72 and its less significant bits by counter 71 output. The output of converter 71 is set to ZERO and the Q output of flip-flop 72 is set to ONE by a SLOW PRR INITIALIZATION PULSE generated in timing control circuitry 12 at the upper left corner of the unrotated raster. ("PRR" is the abbreviation for "pulse repetition rate".) The count in counter 71 is incremented by a LINE-SCAN-RATE pulse furnished to it from timing control circuitry 12 each horizontal blanking interval. Just prior to the center of the display being reached by line scanning, the m-bit counter 71 will have counted $2^m$ scan lines and have reached full count. The next LINE-SCAN-RATE CLOCK pulse input will cause the counter 71 output to change from m parallel bits each ONE to m parallel bits each ZERO and to reset flip-flop 72. When being reset, flip-flop 72 toggles from ONE to ZERO at its Q output; and its Q output remains at ZERO as the remainder of the field is scanned.

The x coordinate of scan is generated using a n-bit counter 73 and a set-reset flip-flop 74; their combined outputs provide the x coordinate in two's complement form, its most significant bit being provided by the Q output of flip-flop 74 and its less significant bits, by counter 73 output. The output of counter 73 is reset to ZERO and the Q output of flip-flop 74 is set to ONE by a FAST-PRR INITIALIZATION pulse generated by timing control circuitry 12 during horizontal blanking. The count in counter 73 is incremented at video rate by PIXEL-SCAN-RATE CLOCK pulses furnished from timing control circuitry 12 except during horizontal blanking and during vertical blanking. Just one pixel before the center of the line being scanned has been reached, the n-bit counter 73 will have counted $2^n$ pixels and have reached full count. The next PIXEL-SCAN-RATE CLOCK pulse input will cause the counter 73 output to change from n parallel bits each ONE to n parallel bits each ZERO and to reset flip flop 74 with its overflow bit. The Q output from flip flop 74 toggles from ONE to ZERO and remains at ZERO for the remainder of the line scan.

The types of circuitry that can be used in timing control circuitry 12 for generating the LINE-SCAN-RATE CLOCK, SLOW-PRR INITIALIZATION, PIXEL-SCAN-RATE CLOCK and FAST-PRR INITIALIZATION pulses are familiar to the video system designer. The PIXEL-SCAN-RATE CLOCK and LINE-SCAN-RATE CLOCK pulses are normally generated by frequency-dividing counters which count pulses from a master clock generator—although often (particularly in systems with monochromatic display) the master clock supplies output pulses at pixel scan rate, which are supplied without frequency division to counter 73 as input for counting. The SLOW-PRR INITIALIZATION and FAST-PRR INITIALIZATION pulses may be provided by separated vertical and horizontal synchronizing pulses, respectively.

A preferred form for the u, v address generator 32 is shown in detail in FIG. 3 and includes a pair of accumulators 81 and 82 for accumulating u and v, respectively. These accumulators are clocked every time a PIXEL SCAN RATE CLOCK pulse occurs to accumulate $\Delta x \cos \phi$ and $-\Delta x \sin \phi$ terms, each multiplied by a scaling factor A. They are also clocked every time a HORIZONTAL BLANKING pulse occurs to accumulate $\Delta y \sin \phi$ and $\Delta y \cos \phi$ terms, each multiplied by A. That is, scan conversion of x and y Cartesian coordinates to u and v Cartesian coordinates, the latter rotated by an angle $\phi$ from the former, is carried forward using accumulation algorithims based on formulas (1) and (2) appearing earlier in the specification. The accumulation of the $\Delta x \sin \phi$ and $\Delta x \cos \phi$ terms, each multiplied by A, during horizontal retrace and the initialization of accumulators 81 and 82 involve further intricacies explained later on in the specification.

The magnitudes of $A \cos \phi$ and $A \sin \phi$ are obtained from ROM's 83 and 84, respectively, responsive to the thirdmost and less significant bits of the programmed display rotation angle $\phi$ in its first and third quadrants and responsive to the complement of those bits in the second and fourth quadrants of $\phi$. This is arranged for by supplying the input to ROM's 83 and 84 from the output of a battery 85 of exclusive-OR (XOR) gates, the first inputs of which all have the secondmost significant bit of $\phi$ applied to them, and the second inputs of which have the still less significant bits of $\phi$ applied to them. Respective bits of the $A \cos \phi$ output of ROM 83 are applied to the first inputs of a battery 86 of XOR gates which selectively complement the bits of that output in its own output when the common connection of their second inputs is supplied a ONE. Complementing is done when a multiple of the $A \cos \phi$ term as expressed in two's complement form is to be subtracted in one of the accumulators 81 and 82. If the $A \cos \phi$ term or a multiple thereof is to be added in one of the accumulators 81 and 82, the interconnected second inputs of battery 86 of XOR gates are supplied a ZERO and forward $A \cos \phi$ without complementing. The $A \sin \phi$ output of ROM 84 is similarly selectively complemented by a battery 87 of XOR gates with first inputs receiving respective ones of its bits. If $A \sin \phi$ or a multiple thereof is to be subtracted in one of the accumulators 81 and 82, the ONE is applied to the interconnected second inputs of these gates so their outputs provide the complement of $A \sin \phi$. If $A \sin \phi$ or a multiple thereof is to be added, a ZERO is applied to the second inputs of these gates.

The determination of whether $A \cos \phi$ from ROM 83 is to be added or subtracted during each step of accumulation in each of the accumulators, 81 and 82, is made as follows. Firstly, $\cos \phi$ (indeed, the cosine of any angle) is known to be positive in the first and fourth quadrants thereof and negative in the second and third quadrants thereof, so an XOR gate 86 to which the firstmost and secondmost significant bits of $\phi$ are applied as inputs is used to supply the first input of an exclusive OR gate 90 an output ZERO in the first and fourth quadrants of $\phi$, and to supply to the first input of gate 90 an output ONE in the second and third quadrants of $\phi$. Secondly, the direction of accumulation must be taken into account. During the vertical blanking integral $-MA \cos \phi$ and $-NA \cos \phi$ terms have to be initially accumulated in the v and u accumulators 81 and 82, (N equals $2^n$ and is the number of pixels in half a scan line; and M equals $2^m$, is the number of scan lines in half a field, and equals N in the special case being particularly considered here, as will be explained in detail later on.) During horizontal retrace of the display it is desirable to subtract $2NA \cos \phi$ from the u accumulator 82 during a "b" portion of horizontal blanking period when this substraction is to be done, a pulse is furnished as a first input to an OR gate 89 receptive of VERTICAL BLANKING pulse as a second input. So at times $-A \cos \phi$ is desired for accumulation, OR gate 89 supplies a ONE as input to an XOR gate 90, which responds with an output that complements the output of XOR gate 88 supplied as its other input. The output of XOR gate 90 is then a ZERO when the $A \cos \phi$ output of ROM 83 or a multiple thereof is to be added during accumulation and is a ONE when such should be subtracted.

A v input multiplexor 91 and a u input multiplexor 92, the outputs of which respectively supply input to v accumulator 81 and input to u accumulator 82, receive at their respective first and second inputs a two's complement number, the most significant bits of which are the output from XOR gate 90 and the less significant bits of which are the output from the battery 86 of XOR gates. Except when the control inputs of input multiplexors 91 and 92 receive a SELECT pulse (generated in a manner described later on in this specification) u input multiplexor 92 selects this number to be forwarded to u accumulator 82 to increment two's complement A x cos $\phi$, and v multiplexor 91 does not select this number for forwarding to v accumulator 81. When a SELECT pulse is applied to their control inputs, v input multiplexor 91 selects this number to be forwarded to accumulator 81 to increment two's complement A y cos $\phi$, and u input multiplexor 92 does not select this number to be forwarded to u accumulator 82.

The determination of whether A sin $\phi$ from ROM 84 is to be added or subtracted during each step of accumulation in each of the accumulators 81 and 82 is made as follows. Firstly, sin $\phi$ (like the sine of any angle) is known to be positive in the first and second quadrants and to be negative in the second and third quadrants. The most significant bit of $\phi$ supplies appropriate indication of the sign of sin $\phi$. Secondly, the direction of accumulation must be taken into account. During pixel-by-pixel scanning of a line of picture, (A sin $\phi$)x terms will be subtracted in the v accumulator 81, and to further this an XOR gate 93 complements the most significant bit of $\phi$ applied to a first of its inputs responsive to a ONE supplied to the other of its inputs from the output of a NOR gate 94 since during picture trace NOR receives no ONE as input. During a portion "a" of vertical blanking pulse, when a negative multiple, $-M$, of A sin $\phi$ is to be accumulated in u accumulator 82, NOR gate 94 still receives no ONE as input, and its output remains ONE. During a portion "b" of vertical blanking integral, when a positive multiple, N, of A sin $\phi$ is to be accumulated in v accumulator 81, NOR gate 94 receives a ONE input, which causes its output to be ZERO, so battery 87 of exclusive OR gates pass A sin $\phi$ without complementing it. During horizontal blanking NOR gate 94 receives a ONE as input which causes its output to be ZERO. So A sin $\phi$ is then forwarded by battery 87 of exclusive OR gates, without being complemented. In sum, the output of XOR gate 93 is ZERO when sin $\phi$ is to be added and ONE when it is to be subtracted. This output is used as the most significant bits of a further two's complement number, as well as controlling the selective complementing of the output of ROM 84 by battery 87 of XOR gates, which provides the less significant bits of this further two's complement number describing sin $\phi$. The u input multiplexor 92 selects this further two's complement number as an input for u accumulator 91 when its control input is supplied a SELECT pulse generated in a manner to be described, and the v input multiplexor selects this further two's complement number as an input for v accumulator 92 at times other than when SELECT pulse is not applied to its control input.

FIG. 4 shows a modification that can be made to the u, v address generator 32 of FIG. 3. ROM's 93 and 94 which store each of A cos $\phi$ and A sin $\phi$ for one octant replace ROM's 83 and 84 which store each of A cos $\phi$ and A sin $\phi$ over a full quadrant, effecting a substantial reduction in ROM required. (In practice, since the ROM's 83 and 84 each need only supply one output per field and have the entire vertical retrace interval to furnish updated output, ROM's 83 and 84 may be so cheap, reduction of the ROM requirement may not be worth the cost of the multiplexors involved.) Battery 85 of XOR gates is reconnected so that a battery 95 of all but one of them are supplied the thirdmost significant bit of $\phi$ at their interconnected first inputs and respective ones of the less significant bits of $\phi$ at their second inputs, the output from battery 85 of XOR gates providing input to ROM's 93 and 94.

This input is one bit shorter than that supplied to ROM's 83 and 84 for the same degree of angular resolution in $\phi$, which also tends to reduce required ROM size. The remaining XOR gate 96 is supplied the second-most and thirdmost significant bits of $\phi$ to provide an output used as the control signal for multiplexors 97 and 98, which select the appropriate ones of ROM's 93 and 94 in each octant of $\phi$ to supply A cos $\phi$ and A sin $\phi$ as respective outputs for application as first inputs for the batteries 89 and 96 of XOR gates, respectively.

FIG. 5 shows the accumulators 81 and 82 in greater detail. FIG. 5 also shows v input and u input multiplexors 91 and 92, an OR gate 99 for developing the SELECT pulses applied to the control inputs of multiplexors 91 and 92, OR gate 89 for generating control signal for multiplexors 810 and 820 included in accumulators 81 and 82 respectively, and an OR gate 100 for developing REGISTER clock pulses for accumulators 81 and 82.

The core of accumulator 81 is a v adder 811 and a v register 812. Register 812 supplies v coordinate at its output, which coordinate has an integral portion used in the FIG. 1 system as a partial READ address for the one of field storage memories 21 and 22 selected for reading. This coordinate also has a fractional or residual portion forwarded to interpolator 23 to govern interpolation in a first of the two dimensions in which interpolation is done. Upon receiving a REGISTER CLOCK pulse, v register 812 content is updated from the output of v adder 811, which has added the previous content of v register 812 to the output of v-scaling multiplexor 810. The v-scaling multiplexor 810 selects as its output either its input taken directly from the output of v input multiplexor 91 or its input taken from the output of multiplexor 91 via means 813 for multiplying that output by the number, N, of pixels in half a scan line, which here is the same as M, the number of scan lines in half a field. This means 813 in the preferred case where the number of pixels in half a scan line is $2^n$, n being integral, can be simply provided by shifting bit placement in v input multiplexor 91 n places towards more significant places; this is simply a matter of electric connection and does not require any further multiplier hardware. In other cases—e.g. where the number of pixels per line is determined by the desire to sample an NTSC color-television baseband signal four times per color subcarrier cycle— this fixed multiplier multiplication can be simply carried out using ROM.

Accumulator 82 is analogous to accumulator 81 in comprising u-scaling multiplexor 820, u adder 821, u register 822 and means 823 for multiplying by N the output of u input multiplexor 92. Operation of accumulators 81 and 82 is similar, the dissimilarities in their respective output data owing solely to the dissimilarities in the input data supplied them by v input multiplexor 91 and to multiplexor 92. The integral portion of the u coordinate at the output of u register 822 is used in the FIG. 1 system as a partial READ address for the one of field storage memories 21 and 22 selected for reading, and the residue is forwarded to interpolator 23 to govern interpolation in a second of the two dimensions in which interpolation is done.

The initialization of the v and u accumulators 81 and 82 for the x, y coordinates descriptive of the upper left corner of display takes place in vertical blanking interval after a REGISTER RESET PULSE at the beginning of that interval is supplied to registers 812 and 822 to reset their contents to "zero". It is desired to then load v register 812 and u registers with the following initial values $u_o$ and $v_o$, respectively, before sweeping out the phantom raster line by line, where N is both the number of pixels per half scan line and the number of scan lines per half field.

$$u_o = (A \cos \phi)(-N) + (A \sin \phi)(-N) \quad (3)$$

$$v_o = (-A \sin \phi)(-N) + (A \cos \phi)(-N) \quad (4)$$

To cause multiplication of the A cos $\phi$ and A sin $\phi$ magnitudes by N, the VERTICAL BLANKING PULSE is applied as an input of OR gate 89 causing its output to be a ONE so multiplexors 810 and 820 select from multiplied-up multiplexor 91 and 92 outputs to supply inputs to adders 811 and 821.

In an "a" portion of the vertical blanking interval following REGISTER RESET PULSE, a ONE is applied to an input of OR gate 99, causing its output to go to a ONE that conditions v input multiplexor 91 to select $-A \cos \phi$ as its output and u input multiplexor 92 to select $-A \sin \phi$ as its output. During this time a single clock pulse is supplied to OR gate 100 which sends a REGISTER CLOCK pulse to registers 812 and 822 to accumulate $-NA \cos \phi$ and $-NA \sin \phi$. In another "b" portion of the vertical blanking interval following REGISTER RESET PULSE, no ONEs are supplied the inputs of OR gate 99, so v input multiplexor 91 and u input multiplexor 92 select A sin $\phi$ and $-A \cos \phi$ to be their respective outputs. During this time a single clock pulse is supplied to OR gate 100 which sends a REGISTER CLOCK pulse to registers 812 and 822 causing them to accumulate NA sin $\phi$ and $-NA \cos \phi$, respectively. So, at the beginning of field scan the initial conditions of registers 822 and 812 are respectively described by equations 3 and 4, above.

During the line scan intervals OR gate 99 receives no ONE as input; so its output is ZERO, causing v input multiplexor 91 to select A sin $\phi$ as its output, and causing u input multiplexor 92 to select A cos $\phi$ as its output. OR gate 89 receives no ONE as input; so its output is ZERO, causing v scaling multiplexor 810 to forward $-A \sin \phi$ to v adder 811 directly without its being scaled-up, and causing u scaling multiplexor 820 to forward A cos $\phi$ to u adder 821 directly, without its being scaled up. A GATED PIXEL SCAN RATE CLOCK pulse is supplied to registers 812 and 822 as each pixel in the line is scanned, incrementing the A cos $\phi$ term in u and the $-A \sin \phi$ term in v.

During an "a" portion of the horizontal blanking interval the line scan is incremented. At this time a ONE is applied as input to OR gate 99 causing a ONE at its output that conditions multiplexors 91 and 92 to select A cos $\phi$ and A sin $\phi$ as their respective outputs. No ONE is supplied as input to OR gate 89, and A cos $\phi$ and A sin $\phi$ are selected by multiplexors 810 and 820 for accumulation of v and of u, respectively, responsive to single REGISTER CLOCK pulse supplied via OR gate 100 to registers 812 and 822 in the "a" portion of the horizontal blanking interval.

In a "b" portion of the horizontal blanking interval, the horizontal retrace is to be carried out by twice subtracting (A sin $\phi$)(N) from v register 812 contents and by twice subtracting (A cos $\phi$)(N) from u register 822 contents. At this time no ONE is supplied as input to OR gate 99; so v input multiplexor 91 selects its A sin $\phi$ input for its output, and u input multiplexor 92 selects its A cos $\phi$ input for its output. A ONE input is supplied OR gate 89 which responds with a ONE at its output that conditions scaling multiplexors 810 and 820 to select as their respective outputs the A sin $\phi$ and $-A \cos \phi$ input multiplexor 91 and 92 outputs as multiplied by N. Two clock pulses are applied to registers 812 and 822 via OR gate 100 in the "b" portion of horizontal blanking interval so NA sin $\phi$ is added twice to the previous contents of v register 812 and NA cos $\phi$ is subtracted twice from the previous contents of u register 822.

The accumulation processes described above permit the generation, at video rates, of phantom raster coordinates to a resolution several bits finer than the number of bits that single out a particular row and column address of the one of the field storage memories 21 and 22 to be read with skewed addresses. These additional bits of address resolution are needed for interpolation among the intensity data stored in address locations closest to the generated u, v address coordinates.

As shown in FIG. 6, systems of scan where M and N differ can be implemented by replacing multiplexors 810 and 820 with multiplexors 810' and 820' that select among input multiplexor 91 and 92 outputs, those outputs multiplied by M, and those outputs multiplied by N, respectively. The outputs of multiplexors 91 and 92 as multiplied by M in multipliers 814 and 824 are selected for accumulation by u accumulator 81 and v accumulator 82 during the "a" portion of the vertical blanking interval; and the outputs of those multiplexors as multiplied by N in multipliers 813 and 823 are selected for accumulation during the "b" portions of the vertical and horizontal blanking intervals. During the times the display is being written, the outputs of multiplexors 91 and 92 are selected for being directly applied to accumulators 81 and 82. E.g., multiplexors 810' and 820' may each comprise three batteries of tri-states with parallel outputs, the first battery forwarding input multiplexor output from low source impedances responsive to a NAND gate indicating absence of vertical blanking signal and "b" portion of horizontal blanking signal, the second battery forwarding input multiplexor output as multiplied by M from low source impedances responsive to the "a" portion of vertical blanking signal, and the third battery forwarding input multiplexor output as multiplied by N from low source impedances responsive to the "b" portions of the horizontal and vertical blanking signals.

FIG. 7 illustrates in greater detail how the two-dimensional interpolator 23 may be constructed. As a convention to facilitate description of the interpolation process, the field storage memory 21 or 22 will be considered to have its storage locations arranged in horizontal rows, addressed in x coordinates during writing and in a u coordinates during reading, and vertical columns, addressed in y coordinates during writing and in v coordinates during reading. This convention will be followed in the claims following this specification as well; but it is not to be construed as limiting upon other spatial orientations of the field storage memories or the display screen, since obviously other orientations are equally feasible. The mathematical expression "a int b" will specify the number of times a may be divided by b without generating a fractional remainder; and "a frac b" will be used as a shorthand expression for $a - b(a \text{ int } b)$, where a and b are randomly chosen numbers.

At any given pixel scan interval the u,v address generator 32 generates an address having a u coordinate of the form $u = (u \text{ int } 1) + (u \text{ frac } 1)$ and having a v coordinate of the form v=(v int 1)+(v frac 1). It is usual to have (u frac1)≠0 and (v frac 1)≠0, so these coordinates fall among four addressable storage locations in the field storage memory as follows:

(u int 1), (v int 1);
(u int 1+1), (v int 1);
(u int 1), (v int 1)+1; and
(u int 1)+1, (v int 1)+1.

These locations are to the upper left, upper right, lower left and lower right, respectively, of the actual point in space defined by the u,v coordinates.

FIG. 8 is a representation of the video amplitudes (shown in analog form by four solid arrows coming out of the page) at four such points in memory, which are to be interpolated among in two dimensions to obtain the video amplitudes at spatial coordinates (u int 1)+(u frac 1), (v int 1)+(v frac 1). The interpolation procedure is to interpolate in u dimension between the video amplitudes at u int 1, v int 1 and at (u int 1)+1, v int 1 to obtain a first intermediate interpolation result; interpolate in that same dimension between the video amplitudes at u int 1, (v int 1)+1 and at (u int 1)+1, (v int 1)+1 to obtain a second intermediate interpolation result; and finally to interpolate in the orthogonally disposed v dimension between the intermediate interpolation results to obtain a final interpolation result.

The first intermediate interpolation result is obtained in the FIG. 7 apparatus by subtracting video amplitude at u int 1, (v int 1)+1 from that at (u int 1)+1, (v int 1)+1 in a subtractor 101 to obtain the slope of the line connecting the video amplitudes at these two points (inasmuch as these points are unity distance apart). These video amplitudes are in digital form as they come from the field storage memory, so the resulting slope is in digital form. The slope then multiplies the u frac 1 in a digital multiplier 102 to obtain the value to be added in an adder 103 to the video amplitude at u int 1, (v int 1)+1 to obtain the first intermediate interpolation result. The second intermediate interpolation result is analogously calculated, differentially combining the video amplitudes at u int 1, v int 1 and (u int 1)+1, v int 1 in subtractor 104; multiplying the resulting difference by u frac 1 in a digital multiplier 105; and adding the product in an adder 106 to the video amplitude at u int 1, v int 1. Interpolation in the vertical plane is then carried out between the intermediate results obtained from the preceding interpolations in the horizontal plane. The second intermediate interpolator result is subtracted from the first in subtractor 107; the difference is multiplied by v frac 1 in a digital multiplier 108; and the product is added in an adder 109 to the second intermediate interpolation result to obtain the final interpolation result.

The two-dimensional linear interpolation can alternatively be carried out by making two interpolations in the vertical plane, followed by an interpolation in the horizontal plane. Surprisingly, the simple linear interpolation schemes disclosed above work well in practice, providing a substantial portion of the image improvement obtainable by more complex interpolation processes. Further, algebraic interpolation according to linear or cubic polynomials or certain other functions can be done by calculation to avoid the need for ROM to look up interpolation coefficients. The read-out from four storage locations required for the linear interpolation process can be obtained by reading out the field storage memory four times as each pixel is scanned, altering one of the address coordinates by one on each successive readout.

FIG. 9 shows how a field storage memory may be organized to provide the four read-outs in parallel, so read out can take up a longer portion of the pixel scan time. The field storage memory is divided into four portions 111, 112, 113 and 114 read out in parallel via a multiplexer 110 to simultaneously supply four bytes of video amplitude information in parallel to the two-dimensional linear interpolation circuitry 23. The least significant bits of v int 1 and u int 1 control the output multiplexor 110 which accesses the memories depending on whether odd or even column address is at the left in the square arrangement of four adjacent locations in memory under consideration and on whether an odd or even row address is uppermost in the arrangement. For certain square arrangements shown as those where the least significant bits of v int 1 and u int 1 both are "zero", the submemories are addressed similarly in v and u.

For squares of four adjacent memory locations displaced one row downward, the lowermost row should be at a row address one higher than the uppermost row. This is taken care of by row-addressing submemories 113 and 114 with the output of adder 115, which adds the least significant bit of v int 1 to the more significant bits of v int 1, used directly to row-address submemories 111 and 112.

For squares of four adjacent memory locations displaced one column to the right, the rightmost column should be at a column address one higher than the leftmost column. This is taken care of by column-addressing submemories 112 and 114 with the output of adder 116, which adds the least significant bit of u int 1 to the most significant bits of u int 1, used directly to column-address submemories 111 and 113.

When the portions 111, 112, 113, and 114 of the field storage memory are addressed responsive to x and y coordinates rather than u and v coordinates, which occurs during writing digitized video into the memory, an input multiplexor 117 responds to the least significant bits of the x and y coordinates to commutate the digitized video into the appropriate one of these portions of the field storage memory.

Rather than loading the field storage memory serially one sample at a time and reading from it four samples at a time, with suitable input and output buffer memories the field storage memory can be loaded more than one sample at a time and read more than four samples at a time, to allow the field storage memory to be clocked at a submultiple of video scan rate.

Thus far in this specification, the pixels in the image to be rotated have been considered to be square—i.e. to have equal horizontal and vertical spatial dimensions as they are reproduced on the display screen. Particularly in broadcast television systems there can be compelling reasons to use rectangular pixels which are non-square. The transformation equations between the x, y non-rotated Cartesian coordinate system and the u, v rotated Cartesian coordinate system are then modified to the form of equations (3) and (4), following.

$$u = A \times \cos \phi + k A y \sin \phi \qquad (5)$$

$$v = -(A/k) \times \sin \phi + A y \cos \phi \qquad (6)$$

The factor k is the ratio between the expression of a spatial length in x or u coordinates to the expression of the same spatial length in the y or v coordinates.

FIG. 10 shows one modification 32 that can be made to the FIG. 3 apparatus so the accumulation is carried out according to equations (5) and (6). ROM 84 storing A sin $\phi$ is replaced by ROM's 841 and 842 storing (A/k) sin $\phi$ and k A sin $\phi$, respectively. Battery 87 of XOR gates is dispensed with; and the outputs of ROM's 841 and 842 are to the first inputs of respective ones of batteries 871 and 872 of XOR gates. Batteries 871 and 872 of XOR gates have their outputs connected to supply inputs of v input multiplexor 91 and u input multiplexor 92, respectively, rather than their being supplied from battery 87 of XOR gates as in the FIG. 3 apparatus. The batteries 871 and 872 of XOR gates receive their second inputs in parallel from the output of XOR gate 93. Rather than using ROM 842, the output of ROM 841 can be multiplied by $k^2$ using a digital multiplier during vertical retrace interval and then held in a latch circuit for the ensuing field scan.

The FIG. 4 apparatus can be modified to generate A cos $\phi$ and $-(A/k)$ sin $\phi$ inputs for v input multiplexor 91 and to generate A cos $\phi$ and kA sin $\phi$ inputs for u input multiplexor 92. ROM's 93 and 94 storing octants of A cos $\phi$ and A sin $\phi$ in FIG. 4 are modified to store octants of (A/k) cos $\phi$ and (A/k) sin $\phi$. Multiplexor 97 output is thus modified to (A/k) |cos $\phi$|; and multiplexor 98 output, to (A/k) |sin $\phi$|. The (A/k) |cos $\phi$| output of multiplexor 97 is multiplied by the factor k in a multiplier during vertical retrace interval, and the resulting A |cos $\phi$| term is stored during the ensuing field scan in a latch circuit to supply inputs to v accumulator 81 and to u accumulator 82. The (A/k) |sin $\phi$| output of multiplexor 98 is used directly to supply input to v input multiplexor 92. It also is multiplied by $k^2$ in a multiplier during the vertical retrace interval, and the resulting (kA) |sin$\phi$| term is stored during the ensuing field scan in a latch circuit to supply the other of u accumulator 82 inputs.

In phantom raster generation apparatus for broadcast television use it may be desired to change the aspect ratio of the television image by expanding or compressing it more in one of the horizontal and vertical directions than in the other before its rotation, if any. In such case the accumulation processes to generate u, v coordinates proceed according to the following coordinate-transformation equations.

$$u = -A \times \cos \phi + k\, B\, y \sin \phi \quad (7)$$

$$v = -(A/k) \times \sin \phi + B\, y \cos \phi \quad (8)$$

Here A and B are the scaling constants in the horizontal and vertical directions, respectively, before image rotation.

FIG. 11 shows a modification of the FIG. 4 apparatus which replaces elements 83, 841, 842 and 85 of FIG. 10. It generates B cos $\phi$ and $-(A/k)$ sin $\phi$ to be supplied as respective inputs to batteries 86 and 871 of XOR gates during v accumulation; and it generates A cos $\phi$ and kB sin $\phi$ to be supplied as respective inputs to batteries 86 and 872 of XOR gate during u accumulation. ROM's 931 and 941 replace ROM's 93 and 94 and store octants of (1/k) cos $\phi$ and (1/k) sin $\phi$, respectively. Multiplexor 97 and multiplexor 98 outputs are thus modified to be (1/k) |cos $\phi$| and (1/k) |sin $\phi$| for all values of $\phi$. The (1/k) |cos $\phi$| output of multiplexor 97 is multiplied by kA and by kB in digital multipliers 932 and 933 respectively, during vertical retrace interval. The resulting products are stored in latch circuits 934 and 935, respectively, for the ensuing field scan. Responsive to the output of OR gate 89 in FIG. 10, a multiplexor 936 selects A |cos $\phi$| from latch circuit 934 as input to the battery 86 of XOR gates when u is being accumulated, but selects B |cos $\phi$| from latch circuit 935 as input to the battery 86 of XOR gates when v is being accumulated. The (1/k) |sin $\phi$| output of multiplexor 98 is multiplied by A and by $k^2$B in digital multipliers 942 and 943, respectively, during vertical retrace interval. The resulting products are stored in latch circuits 944 and 945, respectively, for the ensuing field scan when they are applied as inputs to batteries 871 and 872 of XOR gates, respectively.

The phantom raster generation circuitry thus far described is readily adaptable for use in a television display system where it is desired to locate and programmably rotate on a portion of the display screen a graphic symbol generated from data stored in read-only memory. The ROM itself may be used as display memory or its contents transferred to a random access memory used as the display memory. Such display systems commonly incorporate counters for generating digital descriptions of display screen raster scan in x and y coordinates. Separate phantom raster generating apparatuses may be used for generating the input addressing to each ROM storing an independently rotated graphic symbol. These can take the form of the phantom raster generating apparatus of FIGS. 4 and 5, or the modified forms also described above. The same set of trigonometric function look-up table ROM's can be used for all phantom raster generators by sequentially programming the ROM inputs and storing their sequentially supplied output responses in appropriate latch circuitry. Each ROM is divided into four submemories multiplexed to provide four outputs descriptive of spatially adjacent points in image space responsive to integral portions of the input addressing; and the fractional portions of the input addressing are used to govern interpolation between the four points.

There are a number of possible variants with respect to control of the generation of the rotated phantom raster across that portion of the display field the symbol from a particular ROM is to occupy, and with respect to the way in which that ROM output is selectively gated into the video signal controlling the writing of the display screen. In a preferred apparatus for performing these functions, the stream of y coordinates descriptive of display line scan is digitally compared to the y coordinates of the top and bottom boundaries of the portions of display screen in which the image taken from an image ROM is to appear. This is done to generate a gating signal during those lines of scan in which ROM output is to be used to supply video samples to control display. The portion of the phantom raster generating apparatus used to generate input addressing for the ROM generally corresponding to FIG. 5 is modified so that this gating signal selectively enables the application of clock pulses that occur during horizontal blanking interval to the v register 812 and u register 822 REGISTER CLOCK bus. The stream of x coordinates descriptive of display pixel scan is digitally compared to the x coordinates of the left and right boundaries of the portion of display screen in which the image from that image ROM is to appear for generating a further gating signal. These two gating signals are AND'ed to generate READ ENABLE signal for the ROM. This READ ENABLE signal is also used to selectively enable the application of PIXEL SCAN RATE CLOCK pulses to REGISTER CLOCK bus, for intervals shorter than scan line, during those intervals display trace is between the left and right boundaries of that portion of display screen in which the image from the ROM is to appear.

The display memory for a graphic symbol normally has fewer bits of resolution than that used to store camera-originated images, and in the limit is a bit-map storing bits each of which is indicative of whether the display is to be bright or to be dark at a point on the display screen. Two-dimensional spatial filtering to remove excessive diagonal resolution in the data stored in display memory is impractical to use with graphic symbol storage, since such filtering introduces gray scale that increases the number of video levels the display memory must store. Many graphic images have little spatial—frequency content along lines in image space other than those described by the columns or rows of the display memory, so there is no aliasing introduced when the display memory is addressed by a rotated phantom raster scan. Display memories may store considerable skew-line content in the unrotated image they store, however, at ±45° in single-bit-map display memories or at additional angles in plural-bit-map display memories. In such case, the resolution provided by the columns and rows of the display memory should be slightly reduced respective to the horizontal and vertical resolution of the display screen the A factor used to multiply the trigonometric terms in the accumulation processes should be chosen less than unity, and the image stored in the display memory should be expanded in terms of column and row dimensions so it appears in correct size on the display screen despite the display memory being addressed at a reduced fraction of interlocation spacing. Making display memory resolution $2^{-(\frac{1}{2})}$ that available on the display screen and making A equal to $2^{-(\frac{1}{2})}$ will allow the rotation of the image to any angle without aliasing of skew line information occurring.

FIG. 12 shows representative apparatus wherein the unrotated image stored in a multiply-addressed read-only memory 120 is read using a phantom raster scan generator of the type just described for generating video signal to drive a cathode ray tube 121 for causing the presentation of a rotated image on the screen 122 of CRT 121. In accordance with conventional practice, a timing control circuit 123, typically comprising a master clock oscillator and frequency dividing circuits generates the synchronizing signals for the horizontal and vertical sweep generators 124 and 125 which supply deflection currents to the horizontal and vertical sweep coils causing deflection fo the scanning electron beam in the CRT 121 to raster-scan its screen 122. Timing control 123 also supplies line scan rate and pixel scan rate clock pulses to an accumulating apparatus 130, as well as slow PRR and fast PRR initialization pulses. Apparatus 130 accumulates $u = 2^{-(\frac{1}{2})} \times \cos \phi + 2^{-(\frac{1}{2})} y \sin \phi$ and $v = -[2^{-(\frac{1}{2})}] \times \sin \phi + 2^{-(\frac{1}{2})} y \cos \phi$. The integral portions of these coordinates are used as the bases for generating the read addresses to multiply-address ROM 120 during its reading, and ROM 120 furnishes a plurality of data concerning the addressable locations closest to the point specified by the full u and v coordinates. These data are supplied to a two-dimensional interpolator 131 and are there interpolated among according to the fractional portions of the u and v coordinates to generate samples of a digital video signal. This digital signal is converted to an analog video signal in a digital-to-analog converter 132. Apparatus which combines interpolation and digital-to-analog conversion functions may replace interpolator 131 and converter 132. A video amplifier 133 provides amplified response to the analog video signal supplied by converter 132, which amplified response is applied to the electron gun of CRT 121.

What is claimed is:

1. Apparatus for generating points of a phantom raster scan in u and v orthogonal Cartesian coordinates in synchronism with the generation of at least a portion of a raster scan in x and y orthogonal Cartesian coordinates, responsive to a gated PIXEL-SCAN-RATE CLOCK supplying pulses describing pixel-by-pixel scanning at relatively fast rate in the x direction and to a multiphase LINE-SCAN-RATE CLOCK describing line scanning at relatively slow rate in the y direction, said LINE SCAN RATE CLOCK having in each period between the gated intervals of PIXEL-SCAN-RATE CLOCK a respective pulse associated with each of its phases, the number of phases in said LINE-SCAN-RATE CLOCK between each successive pair of gated intervals of PIXEL-SCAN-RATE CLOCK exceeding the number of fields in each frame of raster scan by at least one, said apparatus comprising:

a first register for storing v coordinates of phantom raster scan clocked by pulses from said gated PIXEL-SCAN-RATE CLOCK and from said LINE-SCAN-RATE CLOCK;

a first adder having a first input to which the output of said first register connects and having an output connected to the input of said first register, whereby it combines with said first register to provide an accumulator, and having a second input;

means for applying $-(A/k) \sin \phi$ to the second input of said first adder simultaneously with the contents of said first register being clocked toward to the first input of said adder responsive to pulses of said PIXEL-SCAN-RATE CLOCK, where A and k are positive-valued scaling factors and $\phi$ is the angle of rotation between the x, y and u, v coordinate systems; and means for applying $A \cos \phi$ to the second input of said first adder simultaneously with the contents of said first register being clocked forward to the first input of said first adder responsive to pulses respectively associated with a number of the phases of said LINE-SCAN-RATE CLOCK equalling the number of fields in each frame of the raster scan.

2. Apparatus for generating points of a phantom raster scan as set forth in claim 1 including:

a second register for storing u coordinates of phantom raster, clocked by pulses from said gated PIXEL-SCAN-RATE CLOCK and from said LINE-SCAN-RATE CLOCK;

a second adder having a first input to which the output of said first register connects and having an output connected to the input of said second register, whereby it combines with said second register to provide an accumulator, and having a second input;

means for applying $B \cos \phi$ to the second input of said second adder simultaneously with the contents of said second register being clocked forward to the first input of said second adder responsive to pulses of said PIXEL-SCAN-RATE CLOCK, where B is a positive-valued scaling factor;

means for applying $kB \sin \phi$ to the second input of said second adder simultaneously with the contents of said second register being clocked forward to the first input of said adder responsive to pulses respectively associated with a number of the phases of said LINE-SCAN-RATE CLOCK equalling the number of fields in each frame of the raster scan; and means for applying signals to the second input of said second adder simultaneously with pulses respectively associated with the remaining phases of said LINE-SCAN-RATE CLOCK for accumulating $-B \cos \phi$ times the number of pulses in each gated interval of said PIXEL-SCAN-RATE CLOCK.

3. In phantom raster generating apparatus having a field storage memory with storage locations addressed by column and by row conformally mapping the pixels in a display field, each of said storage locations storing the respective pixel of the display field at x and y Cartesian coordinates corresponding to the column and row address of that storage location;

means for generating a raster scan of said display field in u and v Cartesian coordinates with pixel by pixel scan at video scan rate over a distance expressed in a number 2N of pixels in the x direction and line by line scan at a submultiple of video scan rate in the y direction, said u and v Cartesian coordinates sharing the same origin as said x and y Cartesian coordinates and having a prescribed degree $\phi$ of rotation from said x and y Cartesian coordinates;

means for applying to said field storage memory during each video scan rate cycle of its reading a plurality of column addresses derived from each modulus of said u coordinate and a plurality of row addresses derived from each modulus of said v coordinate specifying an array of storage locations with address coordinates close to said u, v coordinates; and means responsive to the residues of said u and v coordinates for interpolating among the outputs from said field storage memory during each video scan rate cycle to provide information concerning successive pixels of said phantom raster scan and including within said means for generating a raster scan of said display field in u and v Cartesian coordinates:

means responsive to $\phi$ for generating $A \cos \phi$ and $B \cos \phi$, where A and B are positive-valued scaling factors;

means responsive to $\phi$ for generating $kB \sin \phi$ and $(A/k) \sin \phi$, where k is a positive-valued scaling factor;

u accumulator means, accumulating $A \cos \phi$ at video scan rate as the pixels in a line of the raster are scanned and accumulating $kB \sin \phi$ and $-2NA \cos \phi$ at line scan rate as the lines in a field are scanned, for generating the u coordinates of raster scan; and v accumulator means, accumulating $-(A/k) \sin \phi$ at video scan rate as the pixels in a line of the raster are scanned and $B \cos \phi$ at line scan rate as the lines in a field are scanned, for generating the v coordinates of raster scan.

4. Apparatus as set forth in claim 1, 2 or 3 wherein k is unity-valued.

5. Apparatus as set forth in claim 1, 2 or 3 wherein A and B are of like value.

6. Apparatus as set forth in claim 5 wherein A is less than unity.

7. Apparatus as set forth in claim 6 wherein A substantially equals $2^{-(\frac{1}{2})}$.

8. Apparatus for displaying a rotatable image stored in memory comprising:

a display device having a screen raster-scanned in x and y Cartesian coordinates for presenting a display image responsive to a video signal, the value of y changing by unity between adjacent scan lines on screen and the value of x changing by unity as each pixel in a scan line is transversed;

apparatus for generating u and v Cartesian coordinates as a function of a programmable angle $\phi$, where u equals $A \times \cos \phi + A y \sin \phi$ and v equals $-A \times \sin \phi + A y \cos \phi$, A being a positive scaling factor smaller than unity;

a display memory having storage locations for storing data concerning elements of an unrotated image, multiply addressed by column and by row respectively during reading in response to the integral portion of said u coordinate and the integral portion of said v coordinate;

means responsive to the fractional portions of said u and v coordinates for performing a two-dimensional spatial interpolation between the data read from memory during each successive multiple addressing thereof to provide a sample of video signal; and means responsive to the successive samples of video signal for developing the video signal applied to said display device.

9. Apparatus for displaying a rotatable image stored in memory comprising:

a display device having a screen raster-scanned in x and y Cartesian coordinates for presenting a display image responsive to a video signal, the value of y changing by unity between adjacent scan lines on screen and the value of x changing by unity as each pixel in a scan line is transversed;

apparatus for generating u and v Cartesian coordinates as a function of a programmable angle $\phi$, where u equals $A \times \cos \phi + kA y \sin \phi$ and v equals $-(A/k) \times \sin \phi + A y \cos \phi$, A being a positive scaling factor and k being a positive scaling factor other than unity;

a display memory having storage locations for storing data concerning elements of an unrotated image, multiply addressed by column and by row during reading respectively in response to the integral portion of said u coordinate and in response to the integral portion of said v coordinate;

means responsive to the fractional portions of said u and v coordinates for performing a two-dimensional spatial interpolation between the data read from memory during each successive multiple addressing thereof to provide a sample of video signal; and means responsive to the successive samples of video signal for developing the video signal applied to said display device.

10. Apparatus as set forth in claim 8 or 9 wherein A substantially equals $2^{-(\frac{1}{2})}$.

11. Apparatus for generating points of a phantom raster scan as set forth in claim 1 or 2 wherein said each frame of raster scan comprises at least two line-interlaced fields.

12. Apparatus for generating points of a phantom raster scan as set forth in claim 11 wherein each frame of raster scan consists of only two line interlaced fields.

* * * * *